(12) United States Patent
Boulay

(10) Patent No.: US 7,892,378 B2
(45) Date of Patent: Feb. 22, 2011

(54) MAGNETIC MARKING SYSTEM, METHOD AND MACHINE FOR PRODUCING THE SAME

(75) Inventor: Bernard Boulay, Poleymieux au Mont d'Or (FR)

(73) Assignee: Cryptic, Paris (FR)

( * ) Notice: Subject to any disclaimer, the term of this patent is extended or adjusted under 35 U.S.C. 154(b) by 0 days.

(21) Appl. No.: 12/289,237

(22) Filed: Oct. 23, 2008

(65) Prior Publication Data

US 2009/0078359 A1      Mar. 26, 2009

Related U.S. Application Data

(63) Continuation of application No. 11/730,898, filed on Apr. 4, 2007, now abandoned, which is a continuation of application No. 10/510,920, filed on Feb. 11, 2005, now abandoned.

(51) Int. Cl.
   *B29C 65/48*    (2006.01)
   *B32B 37/02*    (2006.01)
   *B32B 38/04*    (2006.01)
   *B32B 43/00*    (2006.01)
   *G08B 13/14*    (2006.01)

(52) U.S. Cl. .................. 156/152; 156/247; 156/256; 156/289; 156/351; 156/363; 156/378; 340/572.1; 340/572.6

(58) Field of Classification Search ............... 156/152, 156/247, 250, 253, 256, 289, 350, 351, 363, 156/378; 340/572.1, 572.6; 235/493
See application file for complete search history.

(56) References Cited

U.S. PATENT DOCUMENTS 4,242,789 A    1/1981   Fox

| | | | |
|---|---|---|---|
| 4,271,223 A | | 6/1981 | Lambert et al. |
| 4,298,174 A | | 11/1981 | Kovaleski |
| 4,791,720 A | * | 12/1988 | Fedaravichjus et al. ....... 29/737 |
| 4,964,951 A | | 10/1990 | Menyhert |
| 5,020,581 A | | 6/1991 | Gutierrez |
| 5,175,419 A | | 12/1992 | Yamashita |
| 5,729,201 A | | 3/1998 | Jahnes et al. |

(Continued)

FOREIGN PATENT DOCUMENTS

EP    0 492 407 A1    7/1992

(Continued)

OTHER PUBLICATIONS

English translation of JP 10-249963.*

(Continued)

*Primary Examiner*—Philip C Tucker
*Assistant Examiner*—Sing P Chan
(74) *Attorney, Agent, or Firm*—Oliff & Berridge, PLC

(57) ABSTRACT

The invention relates to a marking system comprising wires exhibiting ultrasoft ferromagnetic properties. Said wires are arranged on or in a carrier and are associated with pre-established parallel positions which are separated by a constant gap according to a pre-established frame. The wires can be present or absent in each position, forming a detectable binary code. The inventive marking system can especially be embodied as a magnetically coded label. The invention also relates to a method for producing one such marking system by continuously incorporating ferromagnetic wires into an adhesive complex. The inventive marking system is used to identify and authenticate articles, products or objects.

16 Claims, 8 Drawing Sheets

U.S. PATENT DOCUMENTS

| | | |
|---|---|---|
| 5,831,532 A | 11/1998 | Gambino et al. |
| 5,913,469 A | 6/1999 | Suzuki |
| 6,270,591 B2 | 8/2001 | Chiriac et al. |

FOREIGN PATENT DOCUMENTS

| | | | |
|---|---|---|---|
| EP | 0 667 592 | | 8/1995 |
| FR | 2 344 346 | | 10/1997 |
| FR | 2 760 682 | | 9/1998 |
| GB | 1398516 A | * | 6/1975 |
| JP | A-08-305971 | | 11/1996 |
| JP | A-10-249963 | | 9/1998 |
| JP | 2002245561 A | * | 8/2002 |
| WO | WO 97/14126 | | 4/1997 |
| WO | WO 01/20568 A1 | | 3/2001 |
| WO | WO 01/29755 A1 | | 4/2001 |

OTHER PUBLICATIONS

English Abstract of JP 2002-245561.*
Machine translation of JP 2002-245561.*
H. Chiriac et al., "Magnetic Hysteresis in Glass-Covered and Water-Quenched Amorphous Wires," *Journal of Magnetism and Magnetic Materials*.No. 177-181, pp. 205-206 (1998).
Baronov et al., "Ferromagnetic Resonance in Amorphous Magnetic Wires," *Phys. Met. Metall.*, vol. 67, No. 1, pp. 70-75 (1989).
English Abstract of JP 10-249963.
Machine English Translation of JP 10-249963.

* cited by examiner

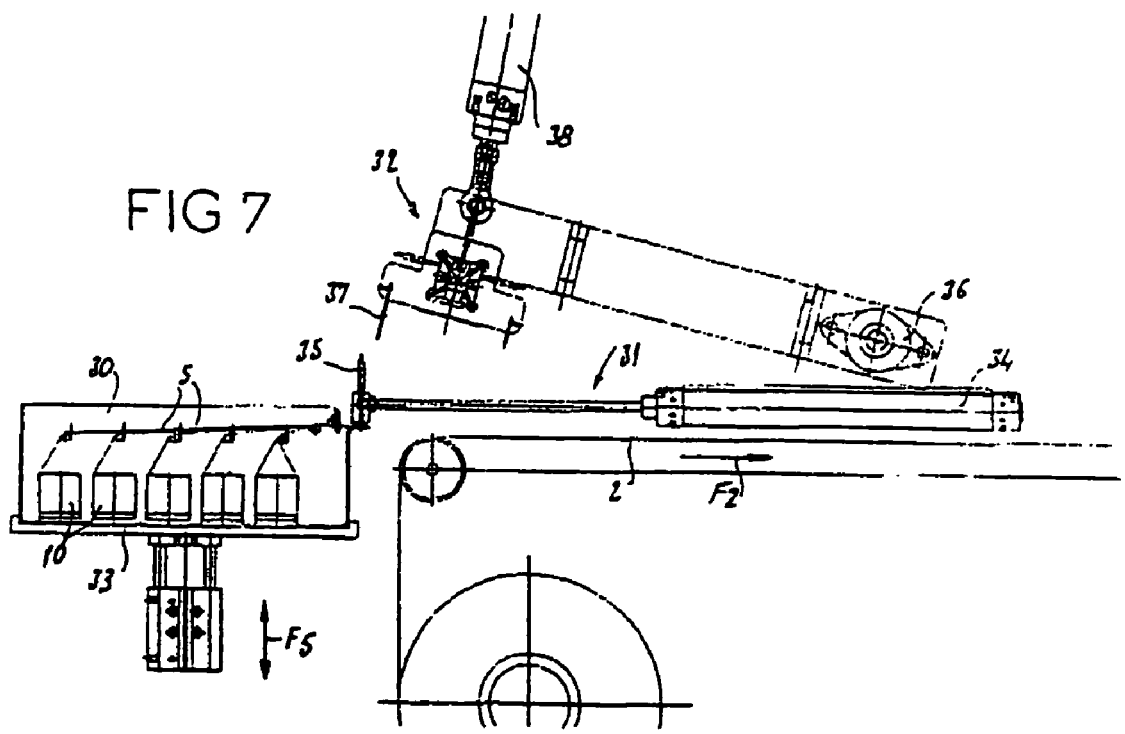
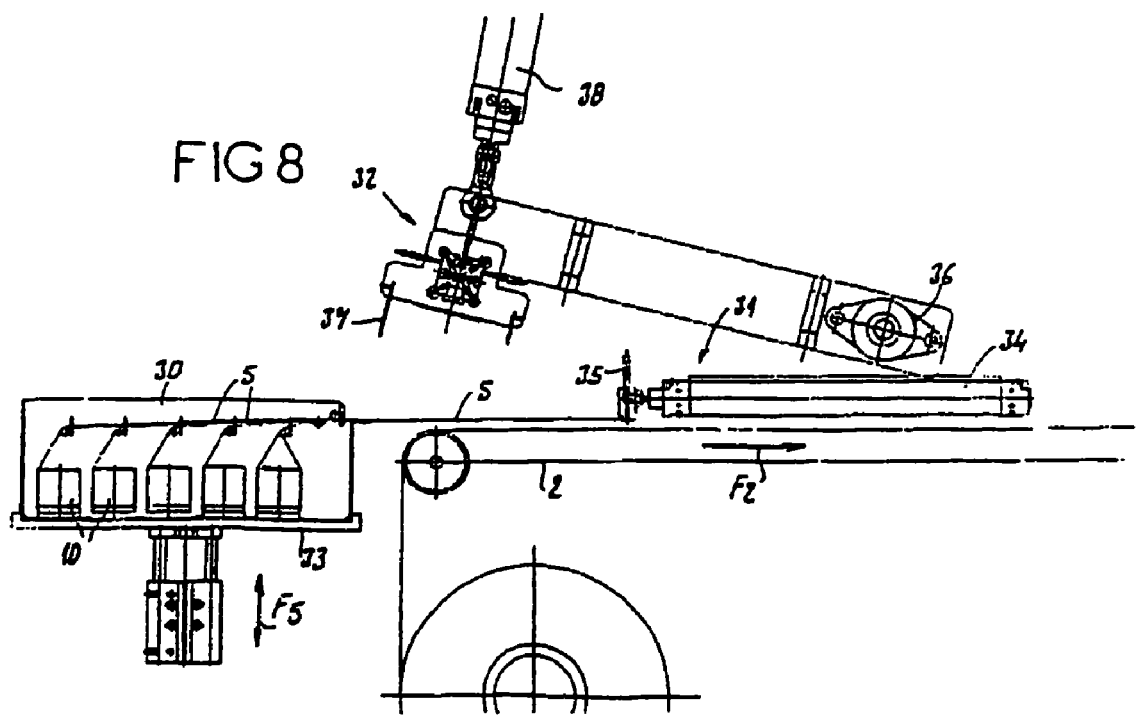

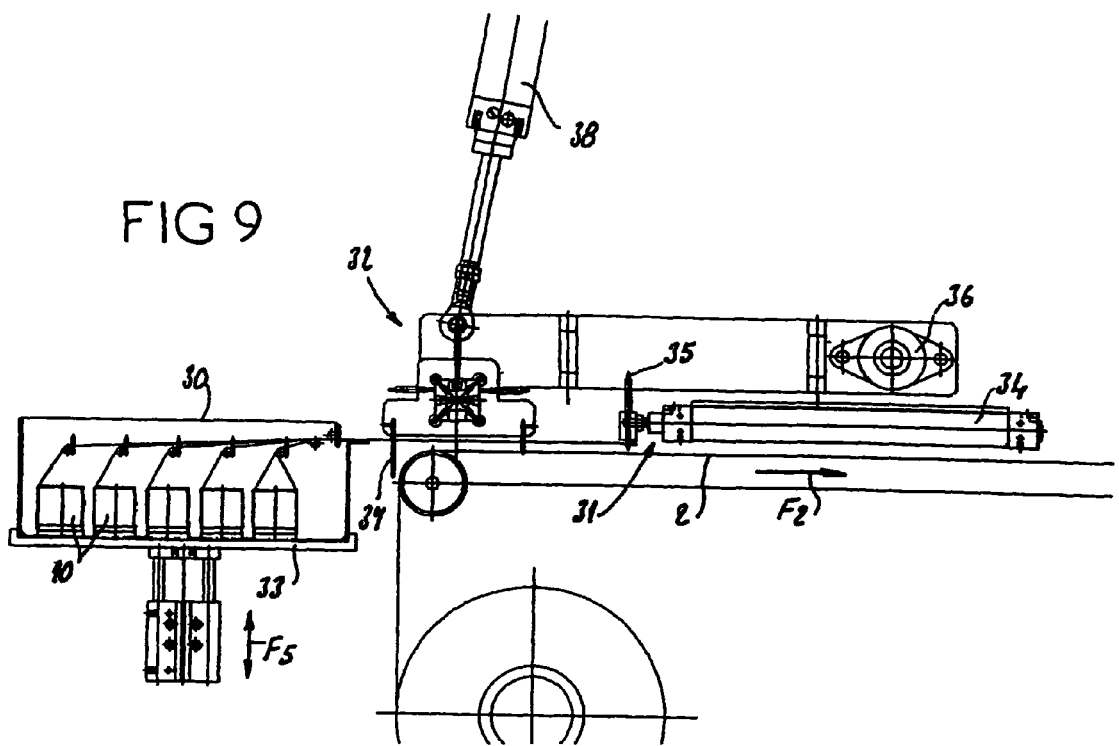
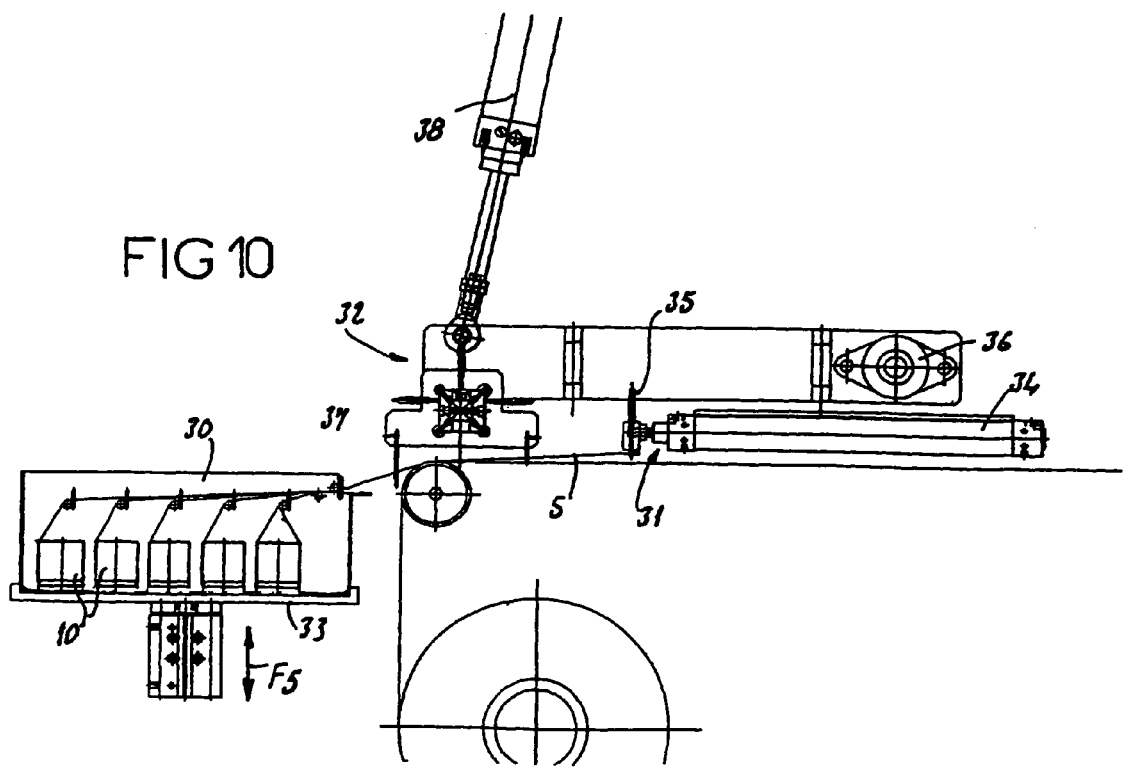

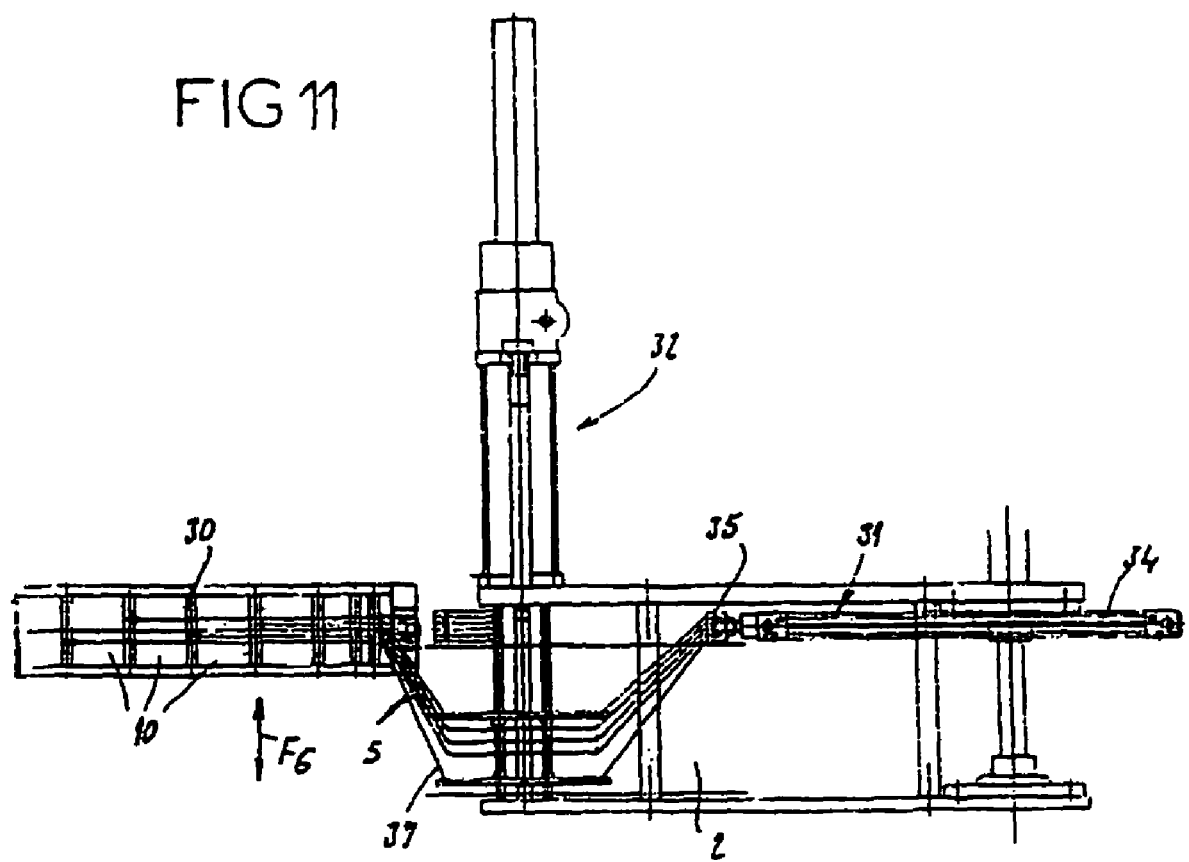

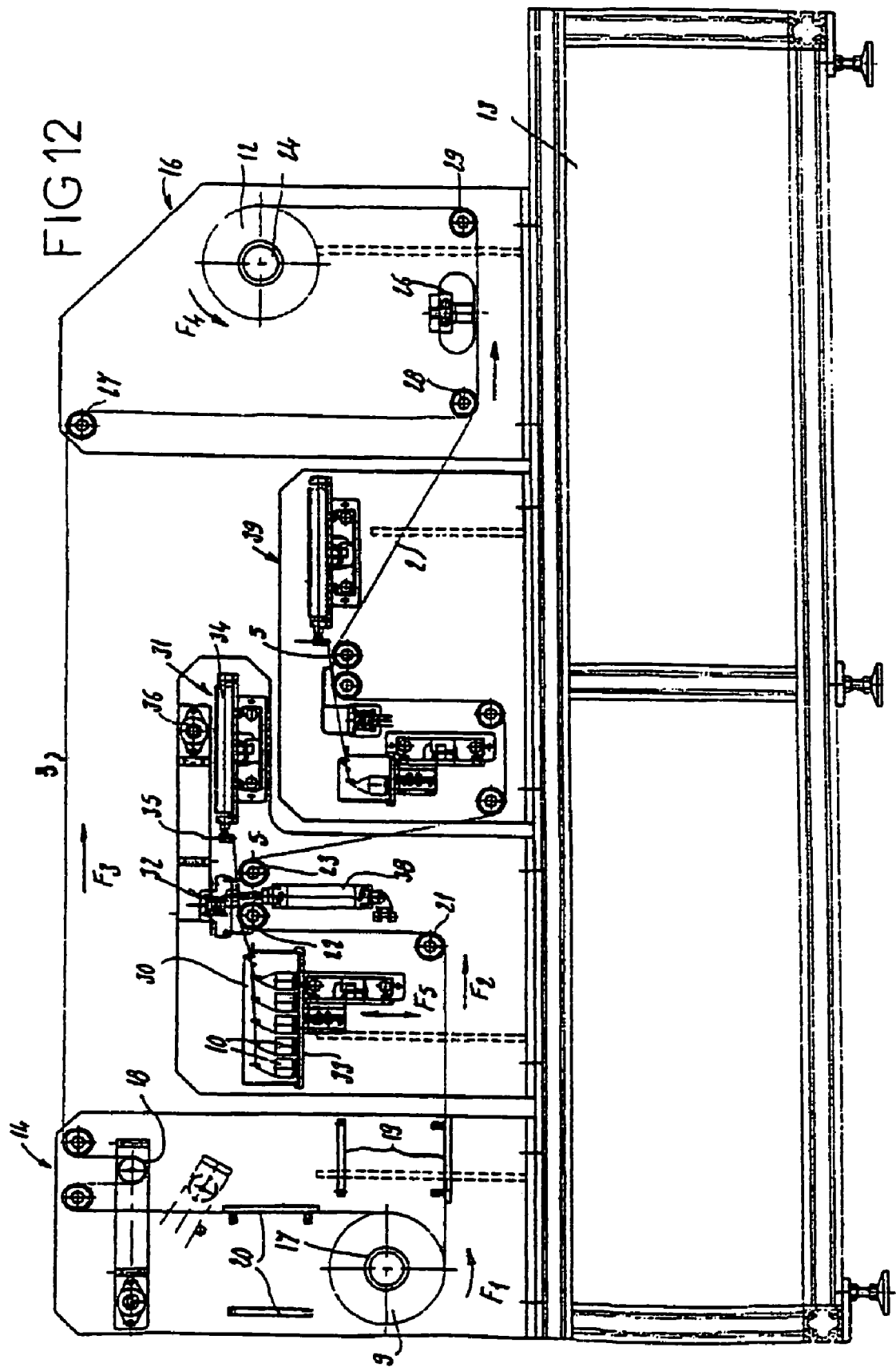

MAGNETIC MARKING SYSTEM, METHOD AND MACHINE FOR PRODUCING THE SAME

This is a Continuation of application Ser. No. 11/730,898 filed Apr. 4, 2007 now abandoned, which in turn is a Continuation of application Ser. No. 10/510,920 filed Feb. 11, 2005, now abandoned, which is hereby incorporated by reference in its entirety. This application claims priority to France Patent Application No. FR 02/04,607 filed Apr. 12, 2002, which is hereby incorporated by reference in its entirety.

The present invention relates in a general manner to the marking of articles, of products or of objects, with a view to their identification and/or to their authentication. This invention pertains, more particularly, to a system for secure marking, by "magnetically coded label" or the like that can be "read" with the aid of an appropriate detector. The marking system according to the invention possesses diverse applications:

protection against the counterfeiting of industrial products, by authentication of the original products;

traceability of products or of articles, via batches or product series, or possibly via an individual article;

identification of products or of articles, in commercial circles, as a supplement or possibly as a replacement for the traditional optical bar code.

The identification of articles and of products by optical bar code is currently well known, but it comprises drawbacks. In particular, an optical bar code may easily be reproduced with the aid of a scanner or a commercial photocopier, or modified, so that it offers no genuine security. Moreover, the necessarily visible nature of an optical bar code may give rise to drawbacks of an aesthetic character, for certain kinds of objects or articles.

Systems for marking by magnetic labels have already been envisaged, even if they are currently not very widespread. By way of examples, mention may be made here of the proposals contained in the documents FR 2344346, U.S. Pat. No. 4,964,951, U.S. Pat. No. 5,175,419 and U.S. Pat. No. 5,729,201. These documents disclose:

use of wider or narrower parallel magnetized bands, that are therefore too easily visible (not transparent);

use of wires of variable length, combined with magnets, resulting in a complex embodiment;

combination of wires having different magnetic characteristics;

simple association of magnetized wires, all equidistant, thereby precluding any possibility of coding.

Most of the solutions already proposed therefore remain fairly complex, and hence expensive, by calling in particular upon complex and poorly controlled magnetic phenomena, without this resulting in improved security. In particular, for certain systems that utilize the length of wires or bands having magnetic properties, an interruption to these wires or bands may cause a modification of the response of the system. Furthermore, the known systems offer only a limited number of combinations for carrying out genuine coding, similar to a traditional bar code, or else they achieve this only at the price of excessive complication, both at the level of the label itself and at the level of the detector to be used to "read" this label.

The present invention aims to remedy all of these drawbacks, by providing a magnetic marking system which, while still being particularly simple and discreet, proves to be extremely reliable and allows coding with very many combinations.

For this purpose, the subject of the invention is essentially a magnetic marking system, which comprises, on or in a carrier, in correspondence with pre-established parallel positions separated by a constant gap according to a pre-established frame, one or more wires having ultrasoft ferromagnetic properties, these parallel wires being present or absent in each of said positions so as to form, through the set of wires present or absent, a detectable binary code.

In one embodiment of the invention, the carrier is of the two-dimensional type and constituted by a sheet of adhesive-coated material, which fixes the wires having ultrasoft ferromagnetic properties in their pre-established positions. This adhesive-coated carrier sheet is advantageously covered, at least in its initial state, with a protective sheet, of the silicone-coated paper kind, which thus also covers the wires.

As a variant, the carrier is of the three-dimensional type, in which case the wires having ferromagnetic properties are embedded in the thickness of this carrier, at a small depth, by comparison with the distance of two neighboring wires, so as in all cases to allow detection by contact or by quasi-contact, with the aid of an electromagnetic detector moving over the surface.

The wires used for the production of such a marking are, preferably, glass-clad amorphous ferromagnetic filaments whose mode of production is explained in "Ferromagnetic resonance in amorphous magnetic wires", by S. A. BARANON et al., Phys. Met. Metall., No. 1, volume 67, pages 70 to 75, 1989.

The metal core of such filaments possesses a diameter of the order of some ten to a few tens of microns, while the thickness of the glass cladding does not exceed a few microns so that the total diameter of the filaments does not exceed 50 microns and that the filaments may be embedded in the adhesive mass of the carrier. The metal core of these filaments is made from an amorphous magnetic alloy essentially composed of cobalt or of iron, of nickel, of boron, of silicon and of carbon, in variable proportions that may be:

Fe or Co>40%,

0<Ni<20%,

18%<Si+B+C<35% of other elements that may also be introduced with amounts of less than 7%.

Such wires, by dint of their amorphous structure, may exhibit according to their composition a positive or negative coefficient of magnetostriction, and they possess a relatively weak magnetic field at saturation (coercive field) (from 50 to 500 A/m), these properties being variable as a function of the composition of the alloy as well as of the relative proportions of alloy and of glass. A more precise description regarding the magnetic properties of these wires may be found in: "Magnetic hysteresis in glass-covered and water-quenched amorphous wires" by H. CHIRIAC et al., Journal of Magnetism and Magnetic Materials 177-181, pages 205 and 206, 1998.

As far as the detection device to be used to "read" the marking is concerned, this is advantageously a portable device, consisting of an excitation coil making it possible to create, in the space or immediate vicinity of the wire, an alternating magnetic field of greater strength than the saturation field of the wire to be detected, and of two balanced reception coils, mounted in opposition, in such a way as not to detect any response signal in the absence of a wire situated in proximity, inside the excitation volume zone. On the other hand, when one of the ferromagnetic wires of a marking is close to the excitation coil, said marking will undergo the influence of its magnetic field and its induced magnetization will describe a hysteresis cycle at the same frequency as the excitation. The wire will then re-emit an electromagnetic field of the same frequency which will be detected essentially by that of the two reception coils that is situated closest to the wire, by virtue of an appropriate design of the detector. By appropriate processing of the signal thus received on the detection device, it is possible to determine the presence of a wire in proximity to the detection device. Consequently, by displacing this portable detection device, in a direction transverse to the magnetic marking wires, it becomes possible to "read" instantaneously the binary code borne by this marking.

Thus, the idea underlying the invention consists in the use of ferromagnetic wires of identical nature, all possessing the same ultrasoft magnetic properties allowing their detection with the aid of an electromagnetic excitation of proximity, and of low power (this detection being independent of the length of the wires), these wires being positioned in a precise manner on or in a carrier, in the manner of a bar code. The marking system thus constituted comprises, by comparison with all the solutions previously proposed, a number of important advantages:

- The wires used being able to possess a very restricted diameter, lying between ten and fifty microns, the system remains invisible to the naked eye, and also imperceptible to the touch. This makes it possible to place the wires on a transparent carrier sheet, for example made of a transparent plastic, the assembly being able to be placed on other normal labels while remaining invisible.
- The possibilities of coding are almost unlimited, given the very large number of possible combinations of the number of wires and of the relative positioning of these wires.
- The principles of coding and of detection call neither upon a differentiation of the magnetic properties of the wires, nor upon a choice of their length, provided that this length is greater than a minimum value, of the order of 5 millimeters. The system therefore remains particularly simple, both as regards the structure of the marking itself, and as regards detection.
- All the parallel wires being identical (in diameter, length, composition, magnetic properties, coercivity), one thus avoids the risk of errors during the manipulation of the coils of wires, for the production of the magnetic markings.
- Insofar as the length of the wires exerts no influence, an interruption of these wires (for example by a "cutter" blow) would not be able to neutralize the system, which continues to provide a well-identified response.
- The ferromagnetic wires may be embedded in any molded or fashioned material, or be included in a textile carrier, thereby rendering the marking yet more discreet, and incorporable directly into a product or object.
- The flexibility of the wires, and as appropriate of their carrier, permits any configuration of label, in particular to form a magnetically coded label to be applied to a cylindrical surface, such as the body of the bottle.
- The magnetic properties utilized here of the wires are very insensitive to variations in temperature, within a wide span (from −50° C. to +80° C. for example), unlike LC type resonating magnetic circuits screen-printed on magnetic labels that can be interrogated at high frequency, in which the capacitance, hence the resonant frequency, varies substantially with temperature, given the thermal variation of the permittivity of the dielectric used.
- The wires being constituted from an ultrasoft amorphous magnetic alloy, they possess weak coercivity which makes it possible to call upon heads of proximity detectors of very weak radiated field, hence having very low power consumption, thereby increasing the autonomy of the portable detectors.
- The detection of presence or of absence of the wires, intervening as secondary antennas, is performed through an analysis of the harmonics generated by these wires as they approach magnetic saturation. Thus, the geometrical arrangement of the parallel wires, and the coding that it permits, lend themselves well to an analysis of the response by signal processing, with implementation of processing software that can tolerate a certain degree of error in the calibration of the gaps between wires, thereby greatly facilitating the design of the machines carrying out the laying of the wires.
- Since the coding is based on wires having soft magnetic properties, it cannot be destroyed, altered or erased by a stray magnetic field, created deliberately or by chance, and of high strength, in contradistinction to many existing magnetic coding systems based on magnetically "hard" elements, such as bank cards, magnetic stripe cards, or labels with two magnetic layers (one hard and the other soft).
- The small diameter of the wires precludes detection thereof by antennas for electronic monitoring of articles (so-called EAS antennas).
- The response of each wire is independent of the strength of the excitation field delivered by the detector (on condition that the minimum strength value for saturating the wires is achieved), and this response is therefore always the same, thereby facilitating the adjustment of the field strength of the excitation coil.
- The principle of parallel wires allows easy production of the magnetic markings in question, continuously or semi-continuously, with sectioning to the desired length.

By way of example, the number of wires of the magnetically coded label according to the invention lies between a minimum of one and a maximum of five. These wires may comprise, in addition to the wires defining a binary code, a first wire for tagging the start of the reading zone, in which the wires defining the binary code are positioned.

In the reading zone, the spacing between the possible positions of wires is preferably equal at the minimum to 2 millimeters, such a minimum "pitch" being necessary to distinguish the wires during detection, while preventing several wires from being located simultaneously inside the zone of critical excitation strength, or preventing these wires from having an influence on one another. The "pitch" is chosen as a function of the dimensions of the labels and of the number of wires, this "pitch" possibly reaching several millimeters. The useful width of the labels (dimension transverse to the wires) may lie between a few millimeters and several centimeters, such a dimension permitting the use of a binary code having several tens of bits, thus offering numerous combinations.

In the simplest design of the coding, the absence of any wire in a given position corresponds to the value ZERO, and the presence of a wire in the relevant position corresponds to the value ONE.

A subject of the invention is also an industrial method for the production of the magnetic marking defined above, in the case where this marking is constituted by a carrier sheet made of adhesive-coated material, which fixes the wires having ferromagnetic properties in their pre-established positions, this carrier sheet having to be covered with a protective sheet.

This method consists, essentially, in unwinding a coil of virgin adhesive complex, which coil consists of a carrier sheet made of adhesive-coated material and of a protective sheet initially covering the adhesive-coated face, in performing an operation of delamination of this adhesive complex, consisting in separating the adhesive-coated carrier sheet from the protective sheet, while advancing these two sheets, in depositing wires having ultrasoft ferromagnetic properties on the adhesive-coated carrier sheet in the longitudinal direction of travel of this sheet, while positioning the wires transversely in a precise manner in correspondence with the code adopted for the marking, then in performing a relamination operation, consisting in returning the protective sheet onto the adhesive-coated carrier sheet henceforth furnished with the wires, and finally in rewinding the reconstituted adhesive complex and incorporating the wires. One thus obtains a coil of adhesive complex, incorporating the wires having ferromagnetic properties, distributed in the desired manner. The coil finally obtained may then be used as any other coil of adhesive complex that is intended for printing and cutting operations, to obtain separate adhesive carriers which, in the present case, will for example be magnetically coded labels with incorporated wires, or products fashioned in the format of any sheets.

Finally, a subject of the invention is a machine specially intended for the implementation of the method defined hereinabove, hence a machine for the production of the magnetic marking, still in the case where the latter is constituted by a carrier sheet made of adhesive-coated material, which fixes the wires having ferromagnetic properties in their pre-established positions, this carrier sheet being covered with a protective sheet.

The machine in question essentially comprises, in combination and from upstream to downstream:
- means for carrying and unwinding a coil of virgin adhesive complex, consisting of a carrier sheet made of adhesive-coated material and a protective sheet initially covering the adhesive-coated face;
- means of delamination, ensuring the separation of the adhesive-coated carrier sheet and of the protective sheet;
- means of bringing and depositing wires having ultrasoft ferromagnetic properties onto the adhesive-coated sheet, including means for the transverse positioning of these wires in correspondence with the code adopted for the marking;
- means of relamination, ensuring the rejoining of the protective sheet and of the carrier sheet made of adhesive-coated material, furnished with the wires; and
- means of driving and winding up the reconstituted adhesive complex incorporating the wires.

Advantageously, the means of bringing and depositing wires having ferromagnetic properties themselves comprise:
- a vertically mobile carrier, for a plurality of coils of wire having ferromagnetic properties;
- means for the initial fastening and the pulling of the ends of the wires emanating from these coils; and
- between said coils of wire and these means of fastening and of pulling, a device for transverse positioning of the wires.

Thus, the machine is equipped so as to initiate the process of depositing the wires, by fastening and pulling the ends of these wires, the carrier of the coils then being placed in the up position so as to avoid untimely gluing of the wires onto the adhesive-coated surface, especially during the transverse positioning of these wires to produce the desired code. Thereafter, the carrier of the coils is lowered, so that the wires become tangential to the adhesive-coated material, and begin to be fixed onto the latter. It will be noted that once fixed, the wires are driven forward with the carrier sheet, thereby rendering superfluous any specific means for unwinding the coils of wires or for pulling the wires.

Preferably, the machine is furthermore equipped, in its downstream part, with means for checking the presence and the correct positioning of the laid wires, these means being able to intervene by "reading" the code formed by the wires, doing so in a manner similar to the "reading" of the same code by a detection device.

In the simplest case, if these latter means note the abnormal absence of a wire, generally caused by the "breakage" of this wire, the machine must be stopped with a view to manual resetting.

However, in a refined embodiment of the machine, the latter also comprises, interposed between the abovementioned means of bringing and depositing the wires and the means of relamination, at least one additional module for laying a wire, making it possible to automatically, and in a quasi-instantaneous manner, cope with the "breakage" of a wire, noted by the means for checking the presence and the correct positioning of the wires. Should the case arise where several similar modules are thus interposed in succession, the machine could even automatically cope with the "breakage" of two or more wires. Advantageously, this machine is also equipped with a marking device, making it possible to tag the defective zone, for the subsequent practical use of the coil.

As may be easily understood, the method and the machine, defined above, allow the automatic continuous production, at high speed and in a reliable manner, of coded "raw material" allowing printing and cutting of an adhesive complex with a view to obtaining markings in accordance with the invention, while making it possible to vary the codes of these markings through the transverse positioning of the wires.

In any event, the invention will be better understood with the aid of the description which follows, with reference to the appended diagrammatic drawing which represents, by way of examples, various embodiments and uses of this magnetic marking system, which also illustrates the method of production according to the invention, and which finally shows forms of execution of the machine for the implementation of this method:

FIGS. 7, 8, 9 and 10 are partial diagrams of this machine, in side view, illustrating successive phases of its operation;

FIG. 11 is another partial diagram of the same machine, in plan view from above;

FIG. 12 is a side view of a variant of this machine.

Figure 1:
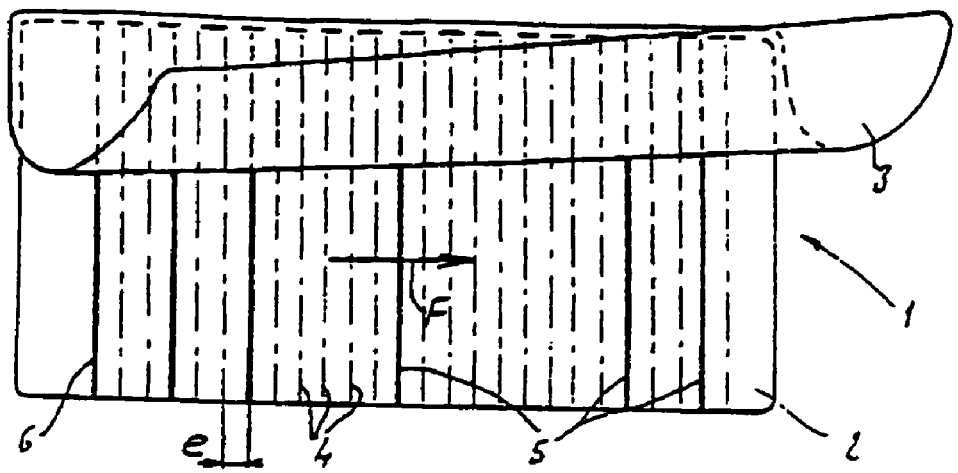
FIG. 1 is a front view of a magnetically coded label in accordance with the invention.

FIG. 1 shows a magnetic marking, made in the form of a magnetically coded label 1. The latter comprises a carrier sheet 2 possessing an adhesive-coated face, and a protective sheet 3, of the silicone-coated paper kind, initially applied to the adhesive-coated face of the carrier sheet 2.

Predefined on the magnetically coded label 1 are parallel positions 4, separated by a constant "pitch" or gap "e". In certain of these pre-established positions 4 are laid parallel wires 5 having ultrasoft ferromagnetic properties. The absence or the presence of the wires 5, in the various possible positions 4, defines a detectable binary code, specific to each label 1.

The marking also advantageously comprises, toward an end of the label 1, a first wire 6 having ferromagnetic properties, allowing the tagging of the start of the "reading zone" in which the other wires 5 are positioned.

All the wires 5 and 6 are fixed, in their pre-established positions, by simple adhesion to the adhesive-coated face of the carrier sheet 2. The protective sheet 3 initially covers these wires 5 and 6.

Figure 2:
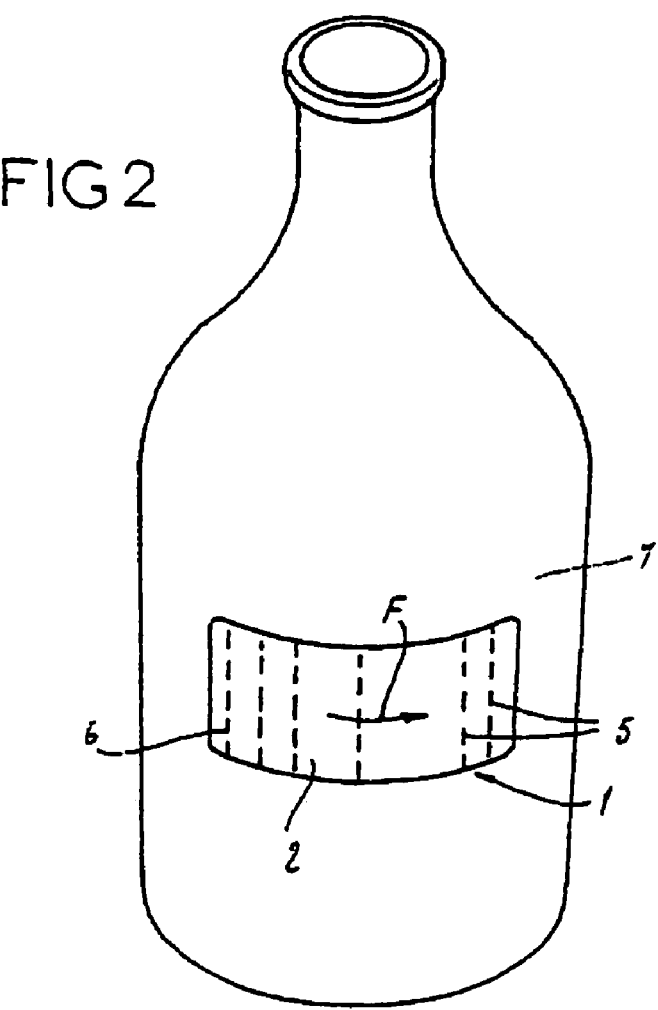
FIG. 2 illustrates a use of this magnetically coded label.

After removal of the protective sheet 3, the magnetically coded label 1 can be fixed by gluing onto a product, an article or an object, such as a bottle 7 as illustrated in FIG. 2. The displacement of an appropriate detector (not represented), along a direction F transverse to the wires 5 and 6, makes it possible to "read" the binary code formed by these wires.

In the exemplary use of FIG. 2, the flexibility of the magnetically coded label 1 allows its winding around the body of the bottle 7. Of course, as illustrated in FIG. 3, the magnetically coded label 1 or other marking according to the invention can also retain a plane configuration, in particular in correspondence with a plane face of an object 8 to be identified or to be authenticated.

Figure 3:
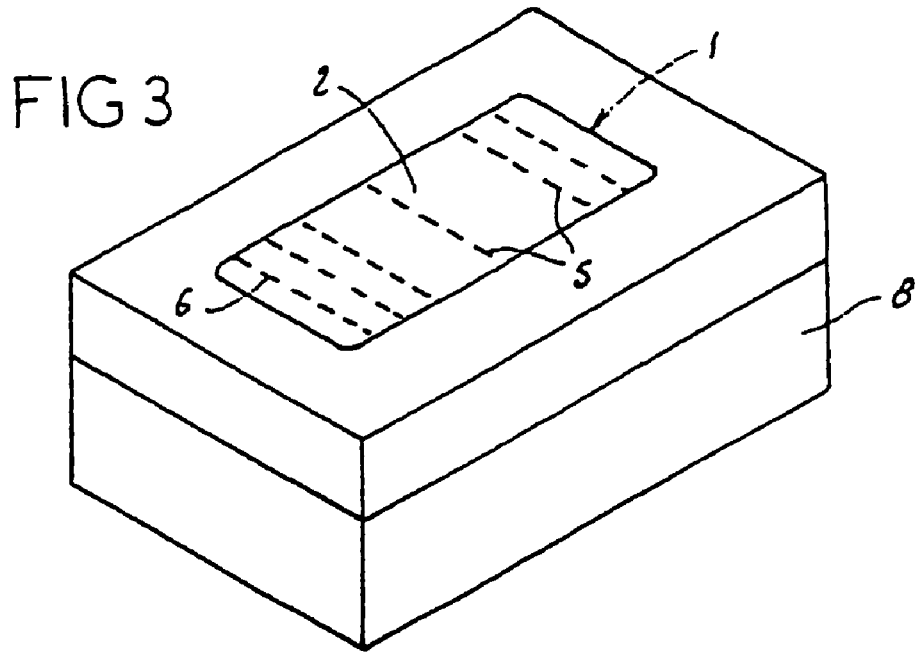
FIG. 3 represents another marking in accordance with the invention, illustrating the use thereof.

Still referring to FIG. 3, it will be noted that the marking 1 with wires 5, 6 having ferromagnetic properties may be embedded in a carrier 2, itself incorporated with the object 8, the wires 5, 6 having, however, to be embedded at small depth, in such a way as to still allow their individual detection and the "reading" of the code formed by the set of these wires.

Figure 4:
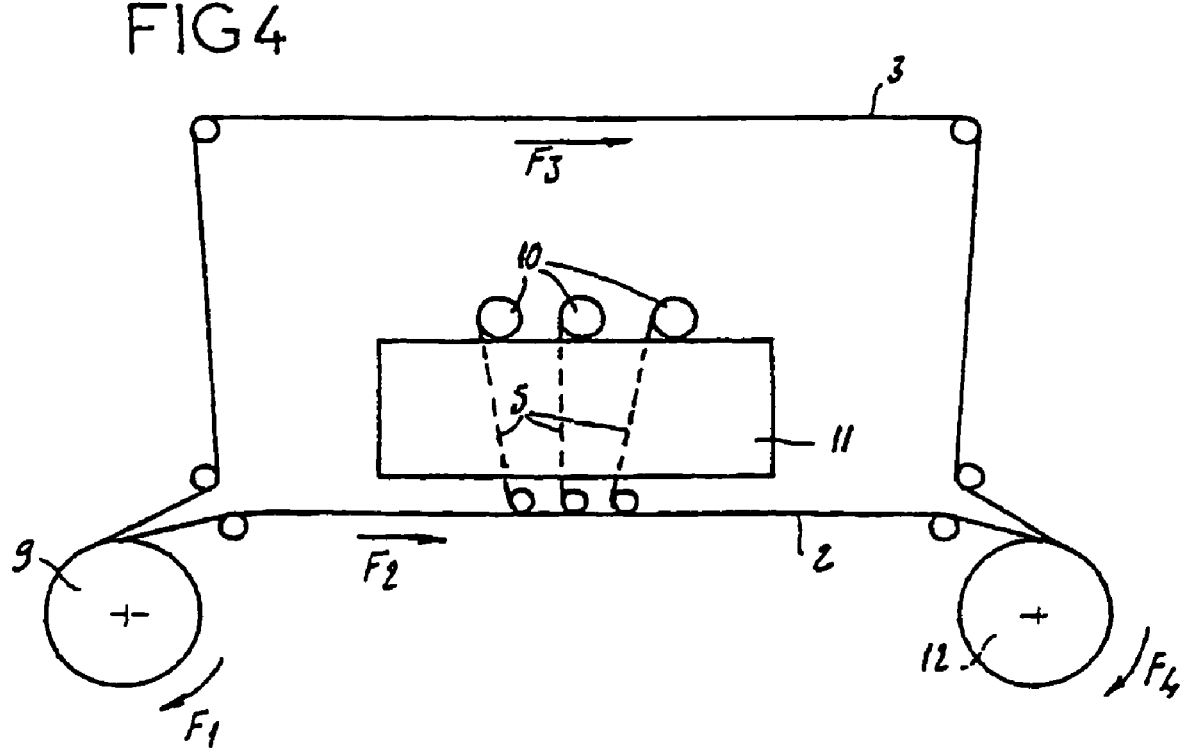
FIG. 4 is a diagram illustrating the method of production of magnetically coded adhesive carriers according to the invention.

FIG. 4 illustrates the method of continuous production of a coded adhesive complex, serving as basis for the making of magnetically coded labels such as that represented in FIG. 1.

The point of departure of the method is a coil 9 of virgin adhesive complex, consisting of a carrier sheet 2 possessing an adhesive-coated face, and of a protective sheet 3 initially applied to the adhesive-coated face of the carrier sheet 2.

The coil 9 is unwound (arrow F1), and the adhesive complex which constitutes it is delaminated, that is to say the adhesive-coated carrier sheet 2 is separated from the protective sheet 3. The two sheets 2 and 3 then advance along distinct paths (arrows F2 and F3), being suitably guided.

Along the path of the adhesive-coated carrier sheet 2, which is situated below the path of the protective sheet 3, is carried out the laying of the wires 5 having ferromagnetic properties, emanating from respective coils of wire 10, the device for laying these wires 5 being symbolized at 11. The wires 5 are thus laid parallel to one another, in the longitudinal direction of travel F2 of the carrier sheet 2, and with a very precise transverse positioning, corresponding to the code adopted for the marking to be produced.

Thereafter, relamination is carried out, that is to say the protective sheet 3 is returned to the carrier sheet 2, henceforth furnished with wires 5. The rejoining of two sheets 2 and 3 "imprisons" the wires 5 between these two sheets 2 and 3, and one thus obtains a reconstituted adhesive complex incorporating the wires 5.

Finally, the reconstituted adhesive complex is rewound, as indicated by the arrow F4, to form a new coil 12. This latter may subsequently be re-employed, for the printing of the complex and for its separation into individual markings, such as the label shown in FIG. 1.

Figure 5:
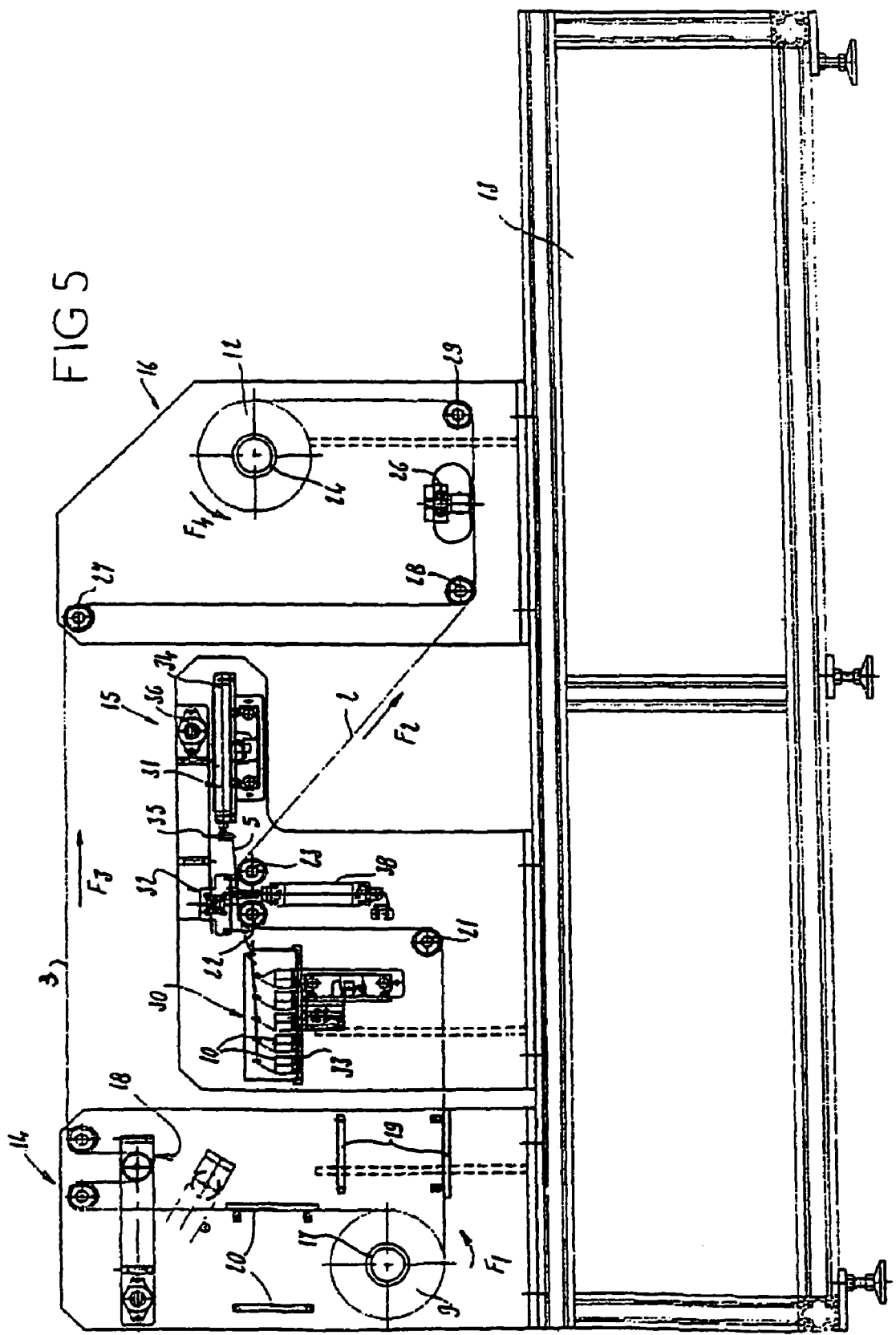
FIG. 5 is a side view of a machine for implementing this method.

FIG. 5 et seq. represent, in greater detail, an automatic machine implementing the method shown diagrammatically in FIG. 4.

Figure 6:
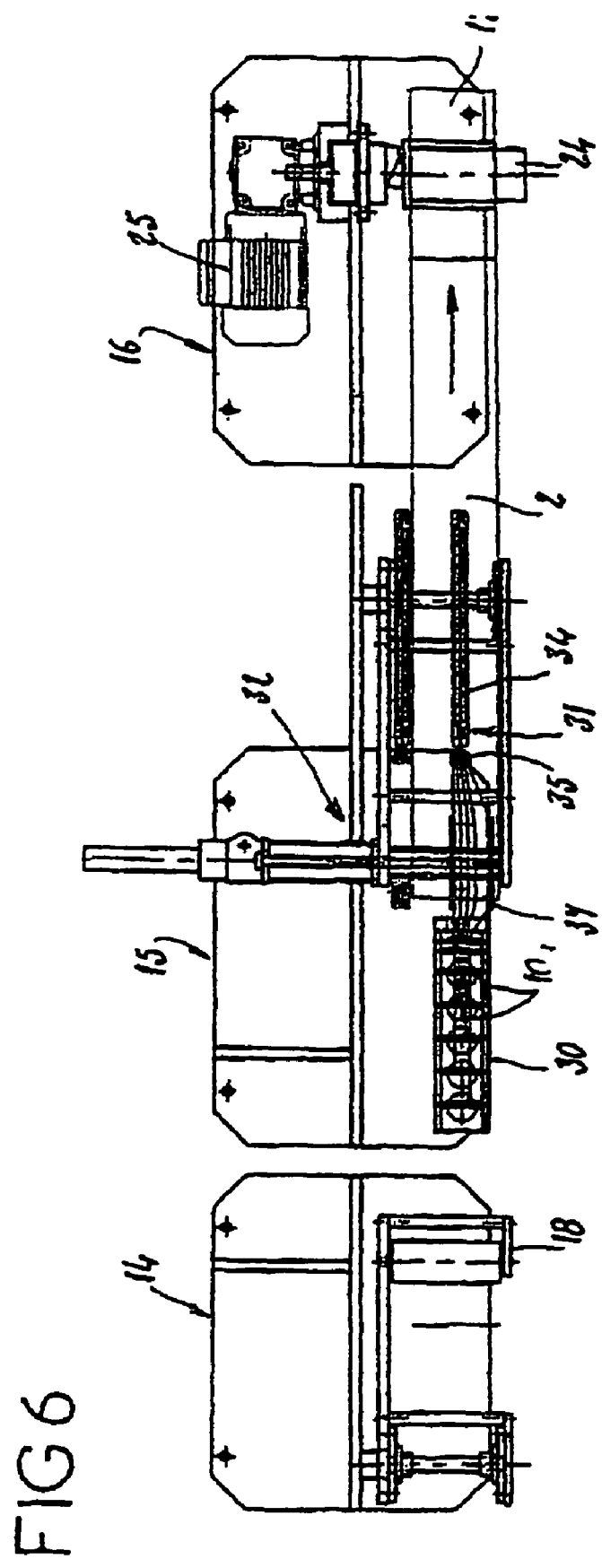
FIG. 6 is a plan view from above of the machine of FIG. 5.

Referring more particularly to FIGS. 5 and 6, the machine comprises, above an elongate bed 13 and from upstream to downstream: a subassembly 14 for unwinding and delamination, a module 15 for depositing the wires, and a subassembly 16 for relamination and rewinding.

The upstream subassembly 14 itself comprises a horizontal carrier shaft 17, for a coil 9 of virgin adhesive complex, to be unwound in the direction of the arrow F1. On leaving the coil 9, this adhesive complex separates into the carrier sheet 2, directed horizontally, and the protective sheet 3, directed firstly vertically. The protective sheet 3 passes over a tension device 18, placed in the upper part of the upstream subassembly 14. This subassembly 14 also comprises pairs of plates 19 and 20, used to facilitate the linking up of the sheets 2 and 3 during a change of coil 9.

The downstream subassembly 16 comprises various rollers 27, 28 and 29 with horizontal axes, which guide the two sheets 2 and 3 in such a way as to join them. This downstream subassembly 16 also comprises a horizontal carrier shaft 24, receiving a coil 12 on which the reconstituted and coded adhesive complex is rewound. The carrier shaft 24 is coupled up to an electric motor 25, which is provided for driving this carrier shaft 24, hence the coil 12, in continuous rotation. Between the last two rollers 28 and 29, the downstream subassembly 16 furthermore comprises a detector 26 detecting the presence and the correct positioning of the laid wires.

The module 15 for depositing the wires, which is interposed between the upstream subassembly 14 and the downstream subassembly 16, itself comprises:

rollers 21, 22 and 23 with horizontal axes, for guiding the adhesive-coated carrier sheet 2;

a removable carrier 30, of the "cassette" kind, for the coils of wire 10, the carrier 30 being mounted vertically movably (arrow F5), by means of a ram;

a subassembly 31 for initial fastening and pulling of the wires 5; and between the "cassette" 30 and the subassembly 31, above the rollers 22 and 23, a device 32 for transverse positioning of the wires 5.

The cassette 30 is borne by a carriage 33, itself movable in the transverse direction.

The subassembly 31 comprises a ram 34, oriented longitudinally, whose upstream directed rod bears members 35 for fastening the ends of the wires 5. This subassembly 31 is itself transversely displaceable, by means of another ram 36.

Finally, the device 32 comprises a comb 37, whose various teeth are transversely displaceable. A ram 38 is provided for controlling the raising and the lowering of the comb 37.

FIGS. 7 to 10 illustrate the successive phases of operation of the machine, on startup of the latter, that is to say after the introduction of a new "cassette" 30:

First Phase (FIG. 7):

The "cassette" 30 being in the up position, the ends of the wires 5, emanating from the various coils 10, are fastened to the members 35, brought close to the "cassette" 30 by the outstroke of the rod of the ram 34. The comb 37 is thus retracted upward.

Second Phase (FIG. 8):

The ram 34 is pulled back, thus drawing forward the wires 5, whose unwound portions are held above the carrier sheet 2, so as to avoid being in contact with the adhesive surface. At this juncture, the wires 5 remain equidistant.

Third Phase (FIG. 9):

The comb 37 is lowered, by actuation of the ram 38. The teeth of this comb 37 then interpose themselves between the wires 5 and each tooth pushes a wire laterally, in such a way as to obtain the desired positions of and gaps between all the wires 5.

Fourth Phase (FIG. 10):

The "cassette" 30 is lowered, so that the wires 5, previously positioned, come into contact with the adhesive-coated face of the carrier sheet 2. The "cassette" 30 is then realigned with the carrier sheet 2, by transverse displacement—see also FIG. 11 (arrow F6).

Fifth Phase (not Illustrated):

The ends of the wires 5, previously grasped by the members 35, are cut by means of an automatic cutting device (not represented).

Sixth Phase:

The motor 25 is turned on, so as to rotate the carrier shaft 24, hence to begin to rewind the coded adhesive complex on the coil 12 (arrow F4). The two sheets 2 and 3 are thus driven forward, in a synchronized manner (arrows F2 and F3), the deposited wires 5 being driven along with the adhesive-coated carrier sheet 2, thereby unwinding them from their respective coils 10.

In the course of this process, the detector 26 constantly checks the presence and the correct positioning of the laid wires 5, and it can in particular instruct the stopping of the machine should there be a "breakage" of a wire 5, or poor reading.

FIG. 12 shows a variant of the machine described above, the subassemblies and elements corresponding to those already described being designated therein by the tags.

In this variant, between the module 15 for depositing the wires 5 and the downstream subassembly 16 for relamination and rewinding, there is furthermore provided an interposed module 39, which is designed according to the same principle as the module 15 but devised for the laying of a single wire 5, emanating from a single coil 40. In combination with the detector 26, the additional module 39 makes it possible, should the absence of a wire be noted, to lay a replacement wire 5 on the carrier sheet 2, in the exact position of the missing wire.

As goes without saying, the invention is not limited solely to the modes of execution described above, by way of examples; it embraces, on the contrary, all embodiment and application variants, be they in particular the number of wires, or the nature of their carrier, or else the constructional details of the machines. Thus, it is possible to incorporate into the marking, according to the same method as the other wires, at least one nondetectable wire, for example nonmagnetic, constituting a "decoy". With the same idea in mind, by reference to the variant of FIG. 12, the interposed additional modules may be multiplied in order to allow the replacement of two or more broken wires.

What is claimed is:

1. A magnetic marking system, comprising:
   a carrier defining pre-established parallel positions separated by a constant gap according to a pre-established frame, each position corresponding to a bit of a binary code;
   one or more wires having ultrasoft ferromagnetic properties provided on or in the carrier in correspondence with one or more of the pre-established parallel positions, the one or more wires being present or absent in each of said parallel positions so as to form, through a collective set of wires present or absent at the pre-established parallel positions, a detectable binary code,
   wherein each ultrasoft ferromagnetic wire is of identical nature, and the binary code is detectable without differentiation of magnetic properties or size of each of the one or more wires and without the provision of a hard magnet provided on the carrier.

2. A magnetic marking system as claimed in claim 1, wherein the carrier is two-dimensional and constituted by a sheet of adhesive-coated material that fixes the one or more wires having ultrasoft ferromagnetic properties in pre-established positions.

3. The magnetic marking system as claimed in claim 2, wherein the adhesive-coated carrier sheet is covered, at least in an initial state, with a silicone-coated protective sheet that also covers the one or more wires.

4. The magnetic marking system as claimed in claim 2, wherein the carrier sheet is a transparent sheet.

5. The magnetic marking system as claimed in claim 1, wherein the carrier is three-dimensional and the one or more wires having ferromagnetic properties are embedded in a thickness direction of the carrier, in pre-established positions.

6. The magnetic marking system as claimed in claim 1, wherein the one or more wires are glass-clad amorphous ferromagnetic filaments.

7. The magnetic marking system as claimed in claim 6, wherein a metal core of the filaments possesses a diameter on the order of some ten to a few tens of microns, a thickness of the glass cladding does not exceed a few microns, and the total diameter of the filaments does not exceed 50 microns.

8. The magnetic marking system as claimed in claim 6, wherein the filaments are made from an amorphous magnetic alloy composed of cobalt or of iron, of nickel, of boron, of silicon and of carbon.

9. The magnetic marking system as claimed in claim 1, wherein the one or more wires comprise, in addition to defining a binary code, a first wire that tags a start of a reading zone.

10. The magnetic marking system as claimed in claim 9, wherein in the reading zone, the constant gap between possible parallel positions of the one or more wires is equal to a minimum of 2 millimeters.

11. The magnetic marking system as claimed in claim 1, further comprising at least one nondetectable wire constituting a decoy incorporated into the marking.

12. A method for the production of a magnetic marking, constituted by a carrier sheet made of adhesive-coated material that fixes one or more wires having ferromagnetic properties in pre-established positions on or in the carrier sheet, the carrier sheet being covered with a protective sheet, the method comprising:
   unwinding a coil of virgin adhesive complex comprising a carrier sheet made of adhesive-coated material and a protective sheet covering the adhesive-coated material;
   delaminating the adhesive complex by separating the adhesive-coated carrier sheet from the protective sheet, while advancing both sheets;
   depositing one or more wires having ultrasoft ferromagnetic properties on the adhesive-coated carrier sheet in a longitudinal direction of travel of the carrier sheet by positioning the one or more wires transversely in a precise manner in correspondence with one or more pre-established parallel positions separated by a constant gap, each parallel position corresponding to a bit of a binary code, to form a collective set of the one or more wires being present or absent in each of the parallel positions to form a detectable binary code adopted for the marking, each ultrasoft ferromagnetic wire being of identical nature, and the binary code is detectable without differentiation of magnetic properties or size of each of the one or more wires and without the provision of a hard magnet provided on the carrier;
   performing a relamination operation by returning the protective sheet onto the adhesive-coated carrier sheet furnished with the deposited one or more wires; and
   rewinding the reconstituted adhesive complex incorporating the one or more wires forming a magnetic binary coded marking.

13. The method as claimed in claim 12, further comprising subjecting the coil finally obtained to printing and cutting operations to obtain separate adhesive carriers each providing a magnetically coded label incorporated with the one or more wires.

14. A machine for production of magnetic marking constituted by a carrier sheet made of adhesive-coated material that fixes one or more wires having ferromagnetic properties in pre-established parallel positions separated by a constant gap, each parallel position corresponding to a bit of a binary code, to form a collective set of the one or more wires being present or absent in each of the parallel positions to form a detectable binary code, the carrier sheet being covered with a protective sheet, the machine comprising, in combination and from upstream to downstream:

means for carrying and unwinding a coil of virgin adhesive complex, consisting of a carrier sheet made of adhesive-coated material and a protective sheet;

means for delaminating the protective sheet from the carrier sheet;

means for bringing and depositing one or more wires having ultrasoft ferromagnetic properties onto the adhesive-coated carrier sheet, including means for transverse positioning of the one or more wires in correspondence with a code adopted for the marking that fixes the one or more wires having ferromagnetic properties in pre-established parallel positions separated by a constant gap, each parallel position corresponding to a bit of a binary code, to form a collective set of the one or more wires being present or absent in each of the parallel positions to form a detectable binary code, each ultrasoft ferromagnetic wire being of identical nature, and the binary code being detectable without differentiation of magnetic properties or size of each of the one or more wires and without the provision of a hard magnet provided on the carrier sheet;

at least one additional module that lays another wire, to correct for a missing or broken wire identified by a means for checking the presence and correct positioning of the one or more wires;

means for relamination, ensuring the rejoining of the protective sheet and of the carrier sheet made of adhesive-coated material, furnished with the one or more wires;

means for checking the presence and correct positioning of the one or more wires that intervenes by reading the code formed by the one or more wires; and means for driving and winding up the reconstituted adhesive complex incorporating the one or more wires, wherein the means for bringing and depositing one or more wires having magnetic properties further includes:

a vertically mobile carrier, for a plurality of coils of wires having ferromagnetic properties;

means for initial fastening and pulling of ends of the wires emanating from the coils; and a device for transverse positioning of the one or more wires, the device being located between said coils of wire and the means for initial fastening and pulling.

15. The machine as claimed in claim 14, wherein the means for initial fastening and pulling of the ends of the wires emanating from the coils includes a ram, oriented longitudinally, having a frontward directed rod that bears members for fastening the ends of the wires.

16. The machine as claimed in claim 14, wherein the device for transverse positioning of the wires comprises a comb having various teeth transversely displaceable, and a ram for controlling raising and lowering of the comb.

* * * * *